US009232537B2

(12) United States Patent
Damnjanovic et al.

(10) Patent No.: US 9,232,537 B2
(45) Date of Patent: Jan. 5, 2016

(54) APPARATUS AND METHOD FOR FAST ACCESS IN A WIRELESS COMMUNICATION SYSTEM

(75) Inventors: Aleksandar Damnjanovic, Del Mar, CA (US); Durga Prasad Malladi, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 784 days.

(21) Appl. No.: 11/671,997

(22) Filed: Feb. 6, 2007

(65) Prior Publication Data

US 2007/0183361 A1 Aug. 9, 2007

Related U.S. Application Data

(60) Provisional application No. 60/771,093, filed on Feb. 7, 2006.

(51) Int. Cl.
| H04W 4/00 | (2009.01) |
| H04J 3/22 | (2006.01) |
| H04B 7/00 | (2006.01) |
| H04W 74/00 | (2009.01) |
| H04L 5/00 | (2006.01) |
| H04W 28/24 | (2009.01) |

(Continued)

(52) U.S. Cl.
CPC .......... *H04W 74/004* (2013.01); *H04W 74/008* (2013.01); *H04W 74/0866* (2013.01); *H04L 5/0007* (2013.01); *H04W 28/24* (2013.01); *H04W 52/50* (2013.01); *H04W 74/0833* (2013.01)

(58) Field of Classification Search
USPC .................................. 370/337, 465; 455/522
See application file for complete search history.

(56) References Cited

U.S. PATENT DOCUMENTS

| 6,496,700 B1 | 12/2002 | Chawla et al. |
| 6,590,881 B1 | 7/2003 | Wallace et al. |
| 6,999,799 B1 | 2/2006 | Almassy |

(Continued)

FOREIGN PATENT DOCUMENTS

| CN | 1617625 A | 5/2005 |
| EP | 1505847 | 2/2005 |

(Continued)

OTHER PUBLICATIONS

Tomcik, Jim, IEEE 802.20 Working Group on Mobile Broadband Wireless Access, MBTDD Wideband Mode Performance Report 2, IEEE C802-05/88r1, pp. 49-51, Jan. 6, 2006.*

(Continued)

*Primary Examiner* — Jinsong Hu
*Assistant Examiner* — William Nealon
(74) *Attorney, Agent, or Firm* — Ashish L. Patel

(57) ABSTRACT

Systems and methodologies are described that facilitate a fast access in a wireless communication system, such as OFDMA. According to various aspects, the system and methods are described for generating an access probe comprising an access signature having quality of service information and transmitting the access probe on a random access channel. Also, the system and methods of receiving an access probe, the access probe comprising quality of service information, generating an access grant in response to the receive access probe, addressing the access grant using information from the access probe, and transmitting the access grant.

24 Claims, 8 Drawing Sheets

(51) Int. Cl.
*H04W 52/50* (2009.01)
*H04W 74/08* (2009.01)

(56) References Cited

U.S. PATENT DOCUMENTS

| | | | |
|---|---|---|---|
| 7,239,884 B2 * | 7/2007 | Khawand et al. | 455/522 |
| 7,349,371 B2 * | 3/2008 | Schein et al. | 370/329 |
| 8,161,957 B2 | 4/2012 | Maeda | |
| 8,169,957 B2 | 5/2012 | Damnjanovic | |
| 2002/0052204 A1 | 5/2002 | Bender et al. | |
| 2002/0064145 A1 | 5/2002 | Khare et al. | |
| 2003/0086381 A1 | 5/2003 | Terry et al. | |
| 2003/0152034 A1 | 8/2003 | Zhang et al. | |
| 2004/0001429 A1 | 1/2004 | Ma et al. | |
| 2004/0082356 A1 * | 4/2004 | Walton et al. | 455/522 |
| 2004/0147274 A1 * | 7/2004 | Khawand et al. | 455/522 |
| 2004/0160916 A1 | 8/2004 | Vukovic et al. | |
| 2004/0190471 A1 | 9/2004 | Bender et al. | |
| 2004/0233870 A1 * | 11/2004 | Willenegger et al. | 370/329 |
| 2004/0264497 A1 | 12/2004 | Wang et al. | |
| 2005/0014508 A1 | 1/2005 | Moulsley et al. | |
| 2005/0195852 A1 | 9/2005 | Vayanos et al. | |
| 2005/0221833 A1 | 10/2005 | Granzow et al. | |
| 2005/0259624 A1 | 11/2005 | Proctor, Jr. | |
| 2006/0018336 A1 | 1/2006 | Sutivong et al. | |
| 2006/0094478 A1 | 5/2006 | Kim et al. | |
| 2006/0209701 A1 | 9/2006 | Zhang et al. | |
| 2007/0047493 A1 * | 3/2007 | Park et al. | 370/331 |
| 2007/0109987 A1 | 5/2007 | Kohlmann et al. | |
| 2007/0147326 A1 * | 6/2007 | Chen | 370/338 |
| 2007/0183355 A1 | 8/2007 | Kuchibhotla et al. | |
| 2007/0291728 A1 | 12/2007 | Dalsgaard et al. | |
| 2008/0102880 A1 | 5/2008 | Gholmieh et al. | |
| 2008/0159183 A1 | 7/2008 | Lindoff et al. | |
| 2008/0167089 A1 | 7/2008 | Suzuki et al. | |
| 2008/0279257 A1 * | 11/2008 | Vujcic et al. | 375/132 |
| 2013/0258919 A1 | 10/2013 | Damnjanovic | |

FOREIGN PATENT DOCUMENTS

| | | |
|---|---|---|
| JP | 2003333661 A | 11/2003 |
| JP | 2006352708 A | 12/2006 |
| KR | 1020010075225 | 8/2001 |
| RU | 2005102606 | 8/2005 |
| TW | 200305318 | 10/2003 |
| TW | 200501678 | 1/2005 |
| TW | 200704037 | 1/2007 |
| WO | 9921375 | 4/1999 |
| WO | 0015050 A1 | 3/2000 |
| WO | 0035117 A2 | 6/2000 |
| WO | WO0056107 A1 | 9/2000 |
| WO | WO2004013845 A1 | 2/2004 |
| WO | WO2004038951 | 5/2004 |
| WO | WO2004107630 | 12/2004 |
| WO | WO2005120002 | 12/2005 |
| WO | 2007145006 A1 | 12/2007 |
| WO | 2008097965 A2 | 8/2008 |

OTHER PUBLICATIONS

IEEE C802.20-06-04, Canchi, (Jan. 2006).*
IEEE C802.20-05/88r1, Tomcik, (Jan. 2006).*
International Search Report—PCT/US07/061793, International Search Authority—European Patent Office, Mar. 16, 2009.
Written Opinion—PCT/US07/061793, International Search Authority—European Patent Office, Mar. 16, 2009.
QUALCOMM Europe, "Characteristics of UL Access Channel 1", 3GPP TSG-RAN WG1 LTE Ad Hoc, R1-060181, Jan. 25, 2006, pp. 1-3.
Taiwanese Search Report—096104420—TIPO—Jan. 25, 2011.
Moore M. and others, Telecommunications: A Beginner's Guide, Hill Associates, Inc., McGraw-Hill Companies, U.S.A., Apr. 2002, p. 466.
NTT DoCoMo Inc., "Requirements on DRX/DTX Control in LTE" 3GPP TSG-RAN WG2 #56, R2-063396, Nov. 6-10, 2006, Riga, Latvia.
Nokia: "3GPP TSG-RAN WG2 Meeting #56 R2-063081: Active Mode DRX Details" 3rd Generation Partnership Project (3GPP); Technical Specification Group (TSG) Radio Access Network (RAN); Working Group 2 (WG2) vol. R2-063081, (Nov. 10, 2006), p. 1-10, XP002463500.
Moore M. and others, Telecommunications: A Beginner's Guide, St.-Petersburg, "BHV-Petersburg", 2003, p. 574.
Nokia: Active Mode DRX 3GPP TSG-RAN WG2 Meeting #55, R2-062752, Oct. 9-13, 2006. Seoul. Korea, pp. 1-3.
Nokia: "Active mode DRX details" 3GPP TSG-RAN WGX Meeting #55, R2-062753, [Online] Oct. 9, 2006-Oct. 13, 2006, pp. 1-10, XP002437990, Seoul, Korea, Retrieved from the Internet: URL:http://www.3gpp.org/ftp/tsg_ran/WG2_RL 2ATSGR2_55/Documents> [retrieved on Jun. 15, 2007].
NTT DoCoMo, Inc.: "Views on DRX/DTT Control in LTE" 3GPP TSG-RAN WG2 #56, R2-063397, Nov. 6-10, 2006, Riga, Latvia, pp. 1-3.
3GPP TR 25.814 V1.0.1, 3rd Generation Partnership Project; Technical Specification Group Radio Access Network; Physical Layer Aspects for Evolved UTRA (Release 7), 3GPP TR 25814 version 101, pp. 1-24, 2005.

* cited by examiner

APPARATUS AND METHOD FOR FAST ACCESS IN A WIRELESS COMMUNICATION SYSTEM

CROSS-REFERENCE TO RELATED APPLICATION

This application claims the benefit of U.S. provisional application Ser. No. 60/771,093, filed on Feb. 7, 2006, and entitled A METHOD OF FAST ACCESS. The entirety of this application is incorporated herein by reference.

BACKGROUND

I. Field

The following description relates generally to wireless communications, and more particularly to schemes for fast access of resources.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

Wireless communication systems have become a prevalent means by which majority of people worldwide have come to communicate. Wireless communication devices have become smaller and more powerful in order to meet consumer needs, improve portability and convenience. The increase in processing power in mobile devices such as cellular telephones has lead to an increase in demands on wireless network transmission systems.

A typical wireless communication network (e.g., employing frequency, time, and code division techniques) includes one or more base stations that provide a coverage area and one or more mobile (e.g., wireless) terminals that can transmit and receive data within the coverage area. A typical base station can concurrently transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams carried by the composite stream. Likewise, a mobile terminal can transmit data to the base station or another mobile terminal.

In a Long Term Evolution (LTE) systems, a random access channel (RACH) may be used when a terminal or user equipment (UE) requires resources for establishing a connection with base station (for example Node B or access network). The random access channel parameters are periodically broadcasted by Node B on the downlink common control channel (CCCH) or one of the broadcast channels (BCH). UE may transmit over RACH only after it achieves downlink synchronization and obtains the most current RACH parameters. The RACH is also used for Uplink layer 1 synchronization and requesting uplink air link resource assignment. In the orthogonal nature of the uplink air interface (for example OFDM or OFDMA systems), it may be necessary that RACH resources be reserved and used only for access. Utilization of RACH is bursty and may be much lower than the utilization of the scheduled traffic data channel. Therefore, a need exists that minimum time/frequency resources be assigned to RACH while ensuring short access delays.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance an aspect, a method of fast access in a wireless communication system, the method generating an access probe comprising an access preamble having quality of service information and transmitting the access probe on a random access channel.

In accordance an aspect, a method of fast access in a wireless communication system, the method receiving an access probe, the access probe comprising quality of service information, generating an access grant in response to the receive access probe, addressing the access grant using information from the access probe, and transmitting the access grant.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents.

DETAILED DESCRIPTION

Figure 1:
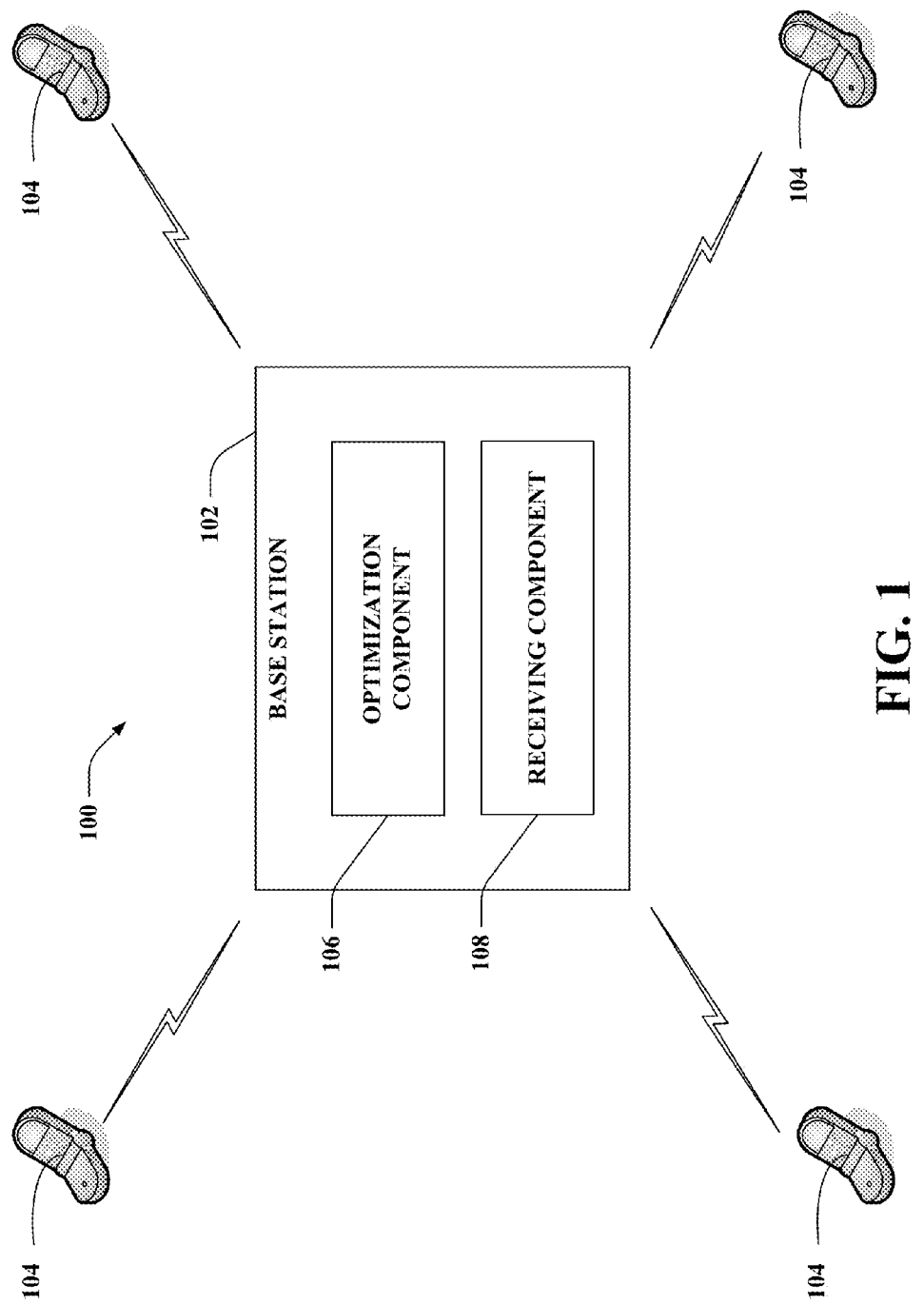
FIG. 1 is an illustration of an example system that effectuates optimal downlink transmission in a wireless communication environment.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station may be utilized for communicating with mobile device(s) and may also be referred to as an access point, Node B, or some other terminology.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a system 100 that effectuates optimal downlink transmission in a wireless communication environment is illustrated in accordance with various embodiments herein. Base station 102 is configured to communicate with one or more mobile devices 104. Base station 102 is comprised of an optimization component 106 that allows for multiplexing of localized and distributed transmissions, and a receiving component 108 that, for example, receives information regarding mobile device capabilities. Optimization component 106 allows for downlink transmission such that frequency diversity is achieved and overhead costs associated with the transmission are mitigated via various schemes, as discussed infra. As can be appreciated, multiplexing of localized and distributed transmissions allows for accommodation of various traffic services, user abilities and further allows a user of the one or more mobile devices 104 to take advantage of channel properties. Moreover, for example, the one or more mobile devices 104 can provide the optimization component 106 at the base station 102 with information related to mobile device capabilities, an estimate of downlink channel conditions, and subscriber data. It is also to be appreciated that the base station 102 can determine a percentage of high speed versus low speed users, store subscriber data and information related to mobile device capabilities. Such capabilities of base station 102 can further allow optimization component 106 to choose the optimal multiplexing scheme according to surrounding conditions.

Figure 2:
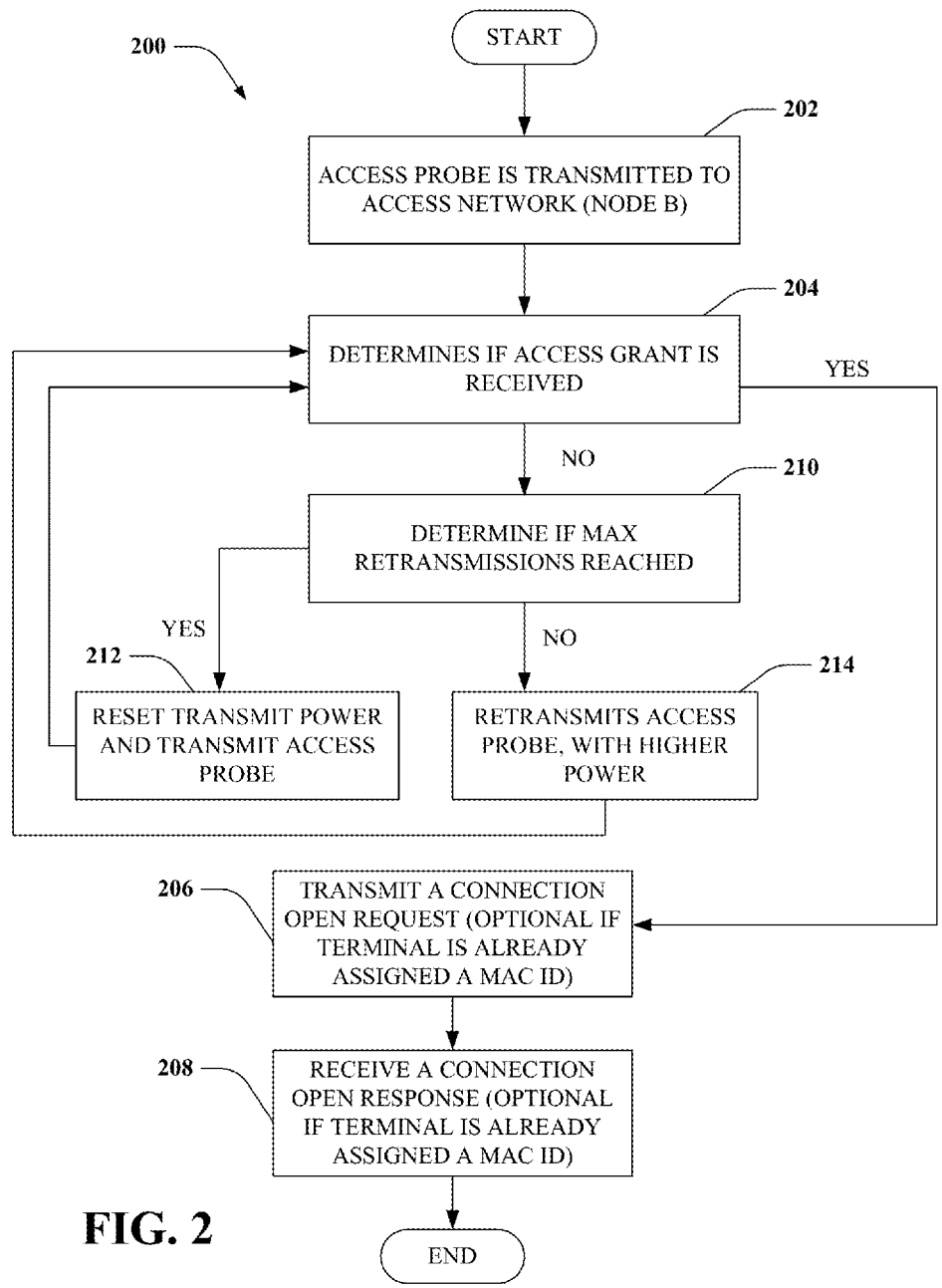
FIG. 2 is an illustration of an example methodology that facilitates a type of system employed by an access terminal in a wireless communications system.
Figure 3:
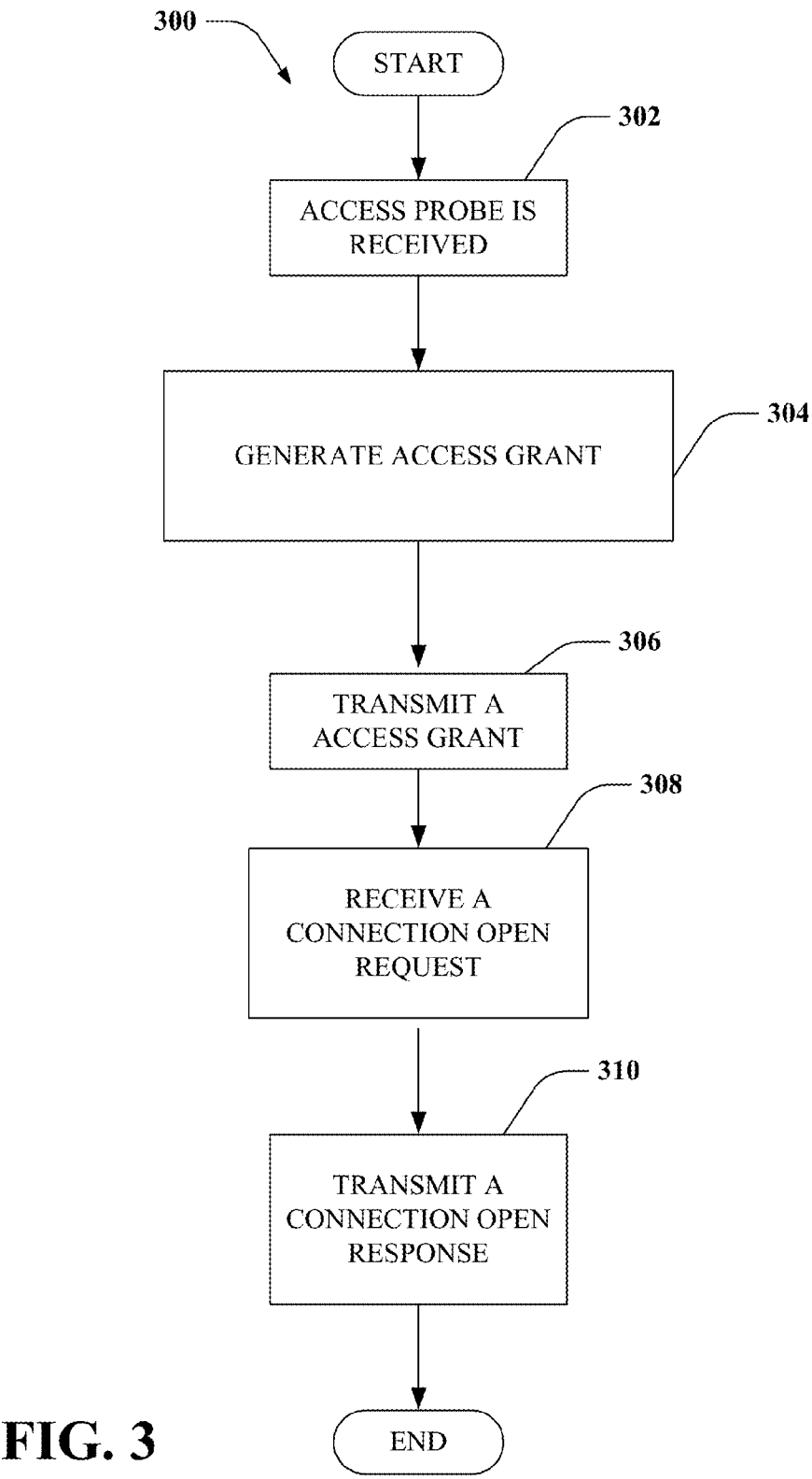
FIG. 3 is an illustration of an example methodology that facilitates a type of system employed by an access point in a wireless communications system.

Referring to FIGS. 2-3, methodologies relating to fast access of communication system is illustrated. While, for purposes of simplicity of explanation, the methodologies are shown and described as a series of acts, it is to be understood and appreciated that the methodologies are not limited by the order of acts, as some acts may, in accordance with the claimed subject matter, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter.

Turning specifically to FIG. 2, a methodology 200 that facilitates a fast access procedure in a wireless communication system (for example, OFDM or OFDMA systems) is illustrated. The method may be used for initial access, synchronization when terminal is lost synchronization or is not in sync with access network, or handoff. The method starts at 202, an access probe is transmitted to the access network (Node B). In an aspect, the access probe is transmitted on random access channel (RACH). To minimize the use of uplink resources, only a preamble is transmitted. The preamble may include downlink C/I information (enables power control of an access grant message sent on the downlink in response to access probe, discussed below), channel quality indicator feedback, QoS related information (enables scheduler to select and/or prioritize initial resource assignment), Random ID (reduces probability that identical access probes from different UEs arrive at Node B at the same time) and Cell ID (used for addressing access probe so that the probe is decoded successfully at the target Node B only). An access probe preamble comprises of an access sequence. The access sequence is derived from UE's downlink C/I, and/or QoS info (for example "QoS bit" comprising of buffer information, limited by available power headroom should be included into access signature sequence information in order to facilitate appropriate selection of bandwidth resources and modulation and coding for one or more messages) and/or a random number used to avoid possible collisions. In an aspect, all access sequences are orthogonal. In another aspect, access signature sequence is not only a function of cell ID but also in addition of cell ID a function of MAC ID (any sort of UE ID is sufficient).

In an aspect, after transmitting the access probe the method moves to 204, a determination is made as to whether an access grant is received in response to the access probe. If access grant is received, the method moves to 206 after decoding the access grant using information from the access probe. At 206, a connection open request message (for example, ConnectionOpenRequest) is transmitted the method waits for response. At 208, a connection open response message (ConnectionOpenResponse) is received in response to the connection open request message. In another aspect, if the terminal is already assigned a MAC ID (for example when terminal is active state), method described at 206 and 208 may be eliminated and the terminal may start exchanging data with access network.

Referring back to 204, if the access grant is not received after a predetermined time, the method moves to 210. At 210, a determination is made as to whether a predetermined maximum number of retransmissions is reached. If the maximum number of retransmission of access probe has occurred, then method moves to 212. At 212, transmit power is reset to original level and access probe is retransmitted. The method moves to 204 to check if the access grant is received. If the maximum number of retransmission of access probe was not reached, the method moves to 214. At 214, the access probe is retransmitted with higher power. The method moves to 204 to check if the access grant is received.

With reference now to FIG. 3, an example methodology 300 that facilitates a receiving an access probe a wireless communications system is illustrated. The method begins at 302, an access probe comprising an access sequence is received. If the access probe is successfully detected, then the method moves to 304. At 304, the access network generates an access grant. The access grant is associated with the access probe and uses information from the received access probe. The access network determines the parameters to provide to the terminal associated with the access probe to the terminal to exchange data with the access network. The access grant, among other things, comprises terminal MAC ID, uplink resource assignment and uplink adjustments. The access grant may be protected using error correction schemes. If the access grant is transmitted on a broadcast channel to several terminals, then it may be addressed using information from access probe, such that only the requester is able to decode the access grant. For example, the Node B may scramble the access grant with access preamble sequence it has received. Only the UE that selected the corresponding access preamble sequence may decode the access grant. After the access grant is generated, at 306, the method transmits the access grant and waits for request for an open connection. At 308, the open connection request message is received. After authenticating the terminal, at 310, the open connection response message is transmitted.

In another aspect, methodologies illustrated in FIG. 2-3 may be applied for handoff scheme. The UE negotiates handoff with the source Node B. In parallel, the source Node B negotiates handoff with the target Node B. Before UE may start exchanging data on target Node B, UE transmits synchronization message towards the target node B. Synchronization message consists of access preamble and it is transmitted on RACH. Signature sequence is a function of target cell ID as its MAC ID. When uplink synchronization is achieved, target Node B sends access grant to UE.

Figure 4:
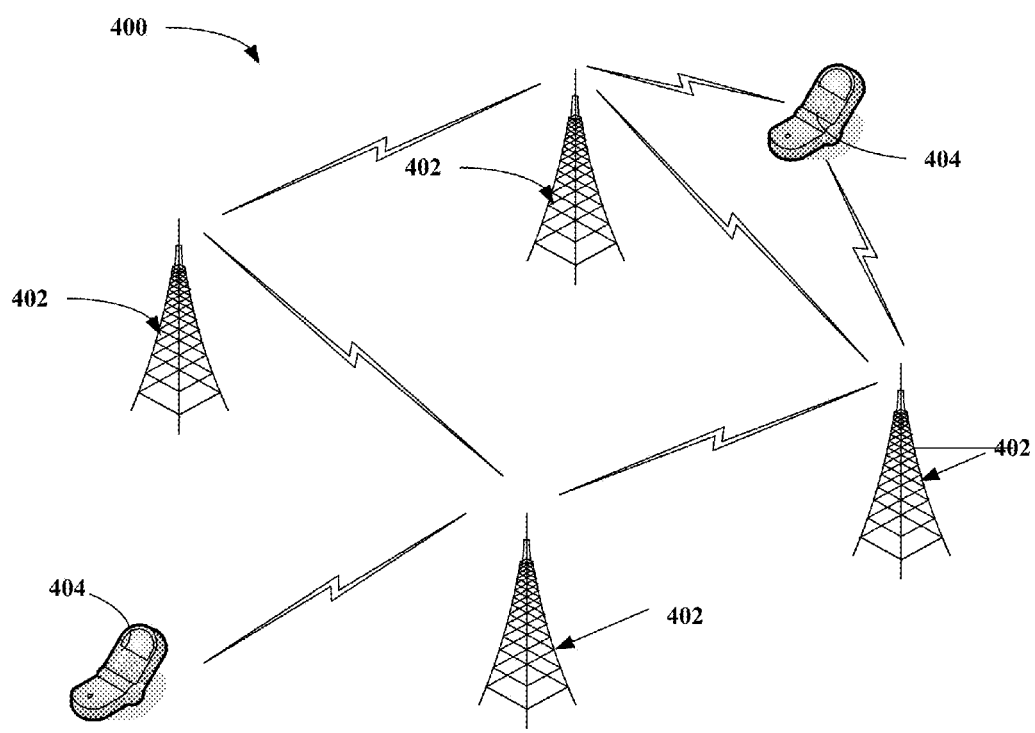
FIG. 4 is an illustration of a wireless communication system in accordance with various aspects set forth herein.

Referring now to FIG. 4, a wireless communication system 400 is illustrated in accordance with various embodiments presented herein. System 400 can comprise one or more base stations 402 (e.g., access points) in one or more sectors that receive, transmit, repeat, etc., wireless communication signals to each other and/or to one or more mobile devices 404. Each base station 402 can comprise a transmitter chain and a receiver chain, each of which can in turn comprise a plurality of components associated with signal transmission and reception (e.g., processors, modulators, multiplexers, demodulators, demultiplexers, antennas, . . . ) as will be appreciated by one skilled in the art. Mobile devices 404 can be, for example, cellular phones, smart phones, laptops, handheld communication devices, handheld computing devices, satellite radios, global positioning systems, PDAs, and/or any other suitable device for communicating over wireless communication system 400.

Base stations 402 can broadcast content to mobile devices 404 by employing OFDM or OFDMA techniques. Frequency division based techniques such as OFDM typically separate the frequency spectrum into distinct channels; for instance, the frequency spectrum may be split into uniform chunks of bandwidth (frequency range). OFDM effectively partitions the overall system bandwidth into multiple orthogonal frequency channels. The frequency channels may use Sync or Async HARQ assignments, depending on the system requirements. Additionally, an OFDM system may use time and/or frequency division multiplexing to achieve orthogonality among multiple data transmissions for multiple base stations 402.

Figure 5A:
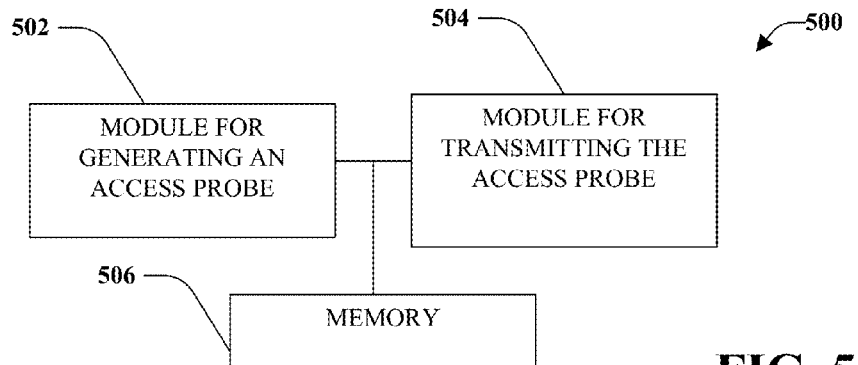
FIG. 5A is a block diagram of a system that facilitates a multiplexed uplink transmission according to mobile device capabilities.

Referring now to FIG. 5A, a system 500 that facilitates fast access in a wireless communication is illustrated. System 500 may include a module 502 for generating an access probe comprising an access preamble having quality of service information and a module 504 for transmitting the access probe on a random access channel. Modules 502 and 504 may be a processor or any electronic device and may be coupled to memory module 506.

Figure 5B:
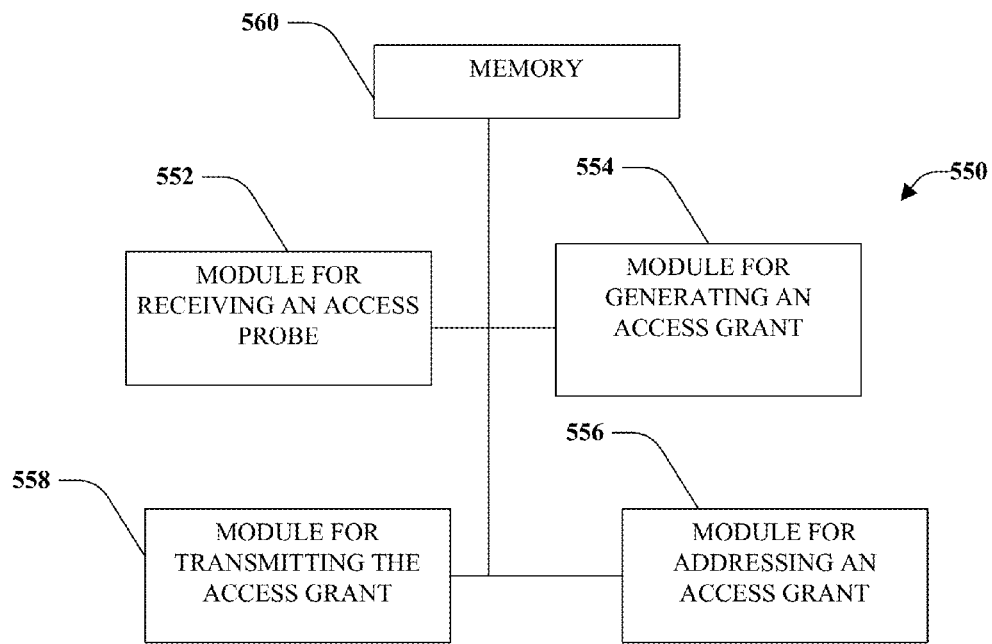
FIG. 5B is a block diagram of a system that facilitates a multiplexed downlink transmission according to mobile device capabilities.

Referring now to FIG. 5B, a system 550 that facilitates fast access in a wireless communication is illustrated. System 550 may include a module 552 for receiving an access probe, the access probe comprising quality of service information, a module 554 for generating an access grant in response to the receive access probe, a module 556 for addressing the access grant using information from the access probe and a module 558 for transmitting the access grant. Modules 552-558 may be a processor or any electronic device and may be coupled to memory module 560.

Figure 6:
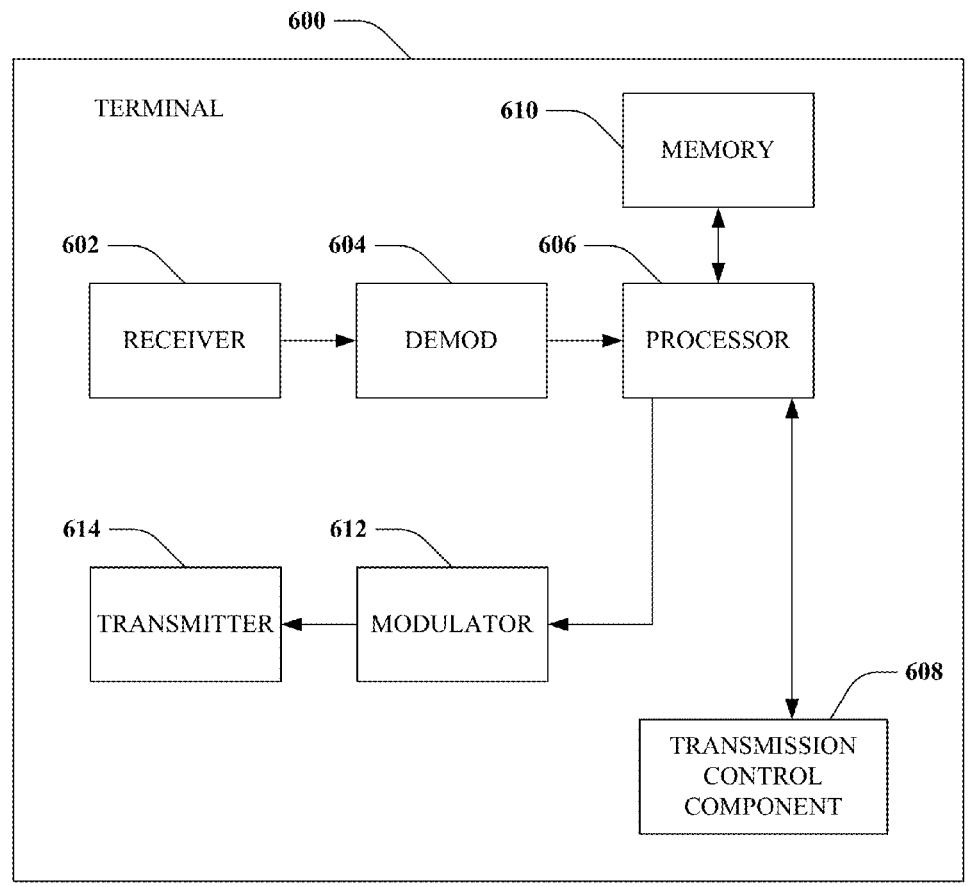
FIG. 6 illustrates a system that provides for other sector communication in accordance with one or more aspects presented herein.

FIG. 6 is an illustration of a terminal or user device 600 that provides for other sector communication in a wireless communication environment in accordance with one or more aspects set forth herein. Terminal 600 comprises a receiver 602 that receives a signal, for instance one or more receive antennas, and performs typical actions (e.g., filters, amplifies, downconverts, etc.) the received signal and digitizes the conditioned signal to obtain samples. A demodulator 604 can demodulate the samples and provide received pilot symbols to a processor 606.

Processor 606 can be a processor dedicated to analyzing information received by receiver component 602 and/or generating information for transmission by a transmitter 614. Processor 606 can be a processor that controls one or more components of terminal 600, and/or a processor that analyzes information received by receiver 602, generates information for transmission by a transmitter 614, and controls one or more components of terminal 600. Processor 606 can utilize any of the methodologies described herein, including those described with respect to FIGS. 2-3.

In addition, terminal 600 can include a transmission control component 608 that analyzes received input, including acknowledgements of successful transmissions. Acknowledgements (ACK) can be received from the serving sector and/or a neighboring sector. Acknowledgements can indicate that a previous transmission has been successfully received and decoded by one of the access points. If no acknowledgement is received, or if a negative acknowledgement (NAK) is received, the transmission can be resent. Transmission control component 608 can be incorporated into the processor 606. It is to be appreciated that transmission control component 608 can include transmission control code that performs analysis in connection with determining receipt of acknowledgement.

Terminal 600 can additionally comprise memory 610 that is operatively coupled to processor 606 and that can store information related to transmissions, an active set of sectors, methods for controlling transmissions, lookup tables comprising information related thereto, and any other suitable information related to transmissions and active set sectors as described herein. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 610 of the subject systems and methods is intended to comprise, without being limited to, these and any other suitable types of memory. Processor 606 is connected to a symbol modulator 612 and transmitter 614 that transmits the modulated signal.

Figure 7:
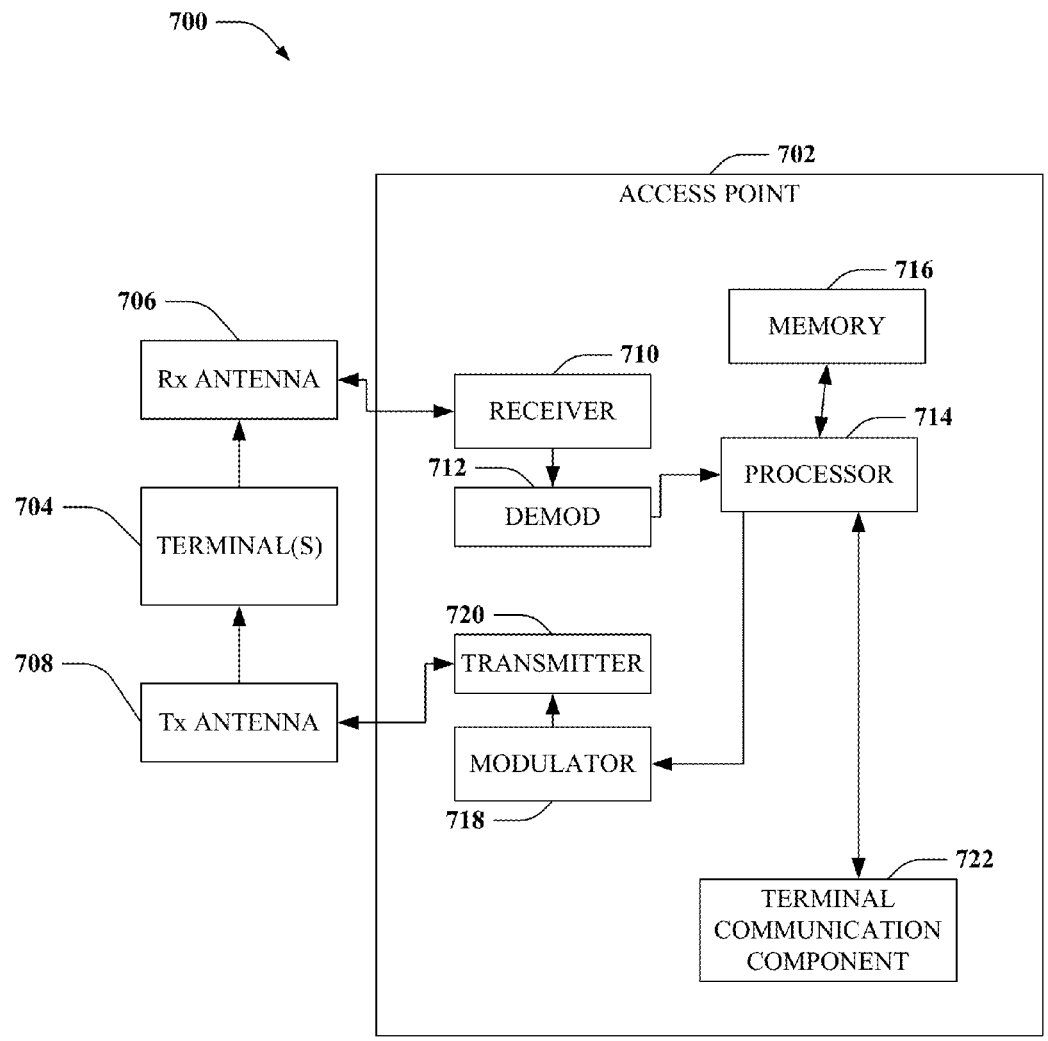
FIG. 7 illustrates a system that provides for processing reverse link communications at a non-serving sector of a terminal in accordance with one or more aspects presented herein.

FIG. 7 is an illustration of a system 700 that facilitates other sector communication in a communication environment in accordance with various aspects. System 700 comprises an access point 702 with a receiver 710 that receives signal(s) from one or more terminals 704 through one or more receive antennas 706, and transmits to the one or more terminals 704 through a plurality of transmit antennas 708. Terminals 704 can include those terminals supported by the access point 702, as well as terminals 704 supported by neighboring sectors. In one or more aspects, receive antennas 706 and transmit antennas 708 can be implemented using a single set of antennas. Receiver 710 can receive information from receive antennas 706 and is operatively associated with a demodulator 712 that demodulates received information. Receiver 710 can be, for example, a Rake receiver (e.g., a technique that individually processes multi-path signal components using a plurality of baseband correlators, . . . ), an MMSE-based receiver, or some other suitable receiver for separating out terminals assigned thereto, as will be appreciated by one skilled in the art. According to various aspects, multiple receivers can be employed (e.g., one per receive antenna), and such receivers can communicate with each other to provide improved estimates of user data. Demodulated symbols are analyzed by a processor 714 that is similar to the processor described with regard to Fig. 8, and is coupled to a memory 716 that stores information related to terminals, assigned resources associated with terminals and the like. Receiver output for each antenna can be jointly processed by receiver 710 and/or processor 714. A modulator 718 can multiplex the signal for transmission by a transmitter 720 through transmit antennas 708 to terminals 704.

Access point 702 further comprises a terminal communication component 722, which can be a processor distinct from, or integral to, processor 714. Terminal communication component 722 can obtain resource assignment information for terminals supported by neighboring sectors. In addition, terminal communication component 722 can provide assignment information to neighboring sectors for terminals supported by access point 702. Assignment information can be provided via backhaul signaling.

Based upon information regarding assigned resources, terminal communication component 722 can direct detection of transmissions from terminals supported by neighboring sectors, as well as decoding of received transmissions. Memory 716 can maintain packets received from terminals prior to receipt of the assignment information necessary for decoding of packets. Terminal communication component 722 can also control transmission and receipt of acknowledgments indicating successful reception and decoding of transmissions. It is to be appreciated that terminal communication component 722 can include transmission analysis code that performs utility based control in connection with assigning resources, identifying terminals for soft handoff, decoding transmissions and the like. The terminal analysis code can utilize artificial intelligence based methods in connection with performing inference and/or probabilistic determinations and/or statistical-based determinations in connection with optimizing terminal performance.

Figure 8:
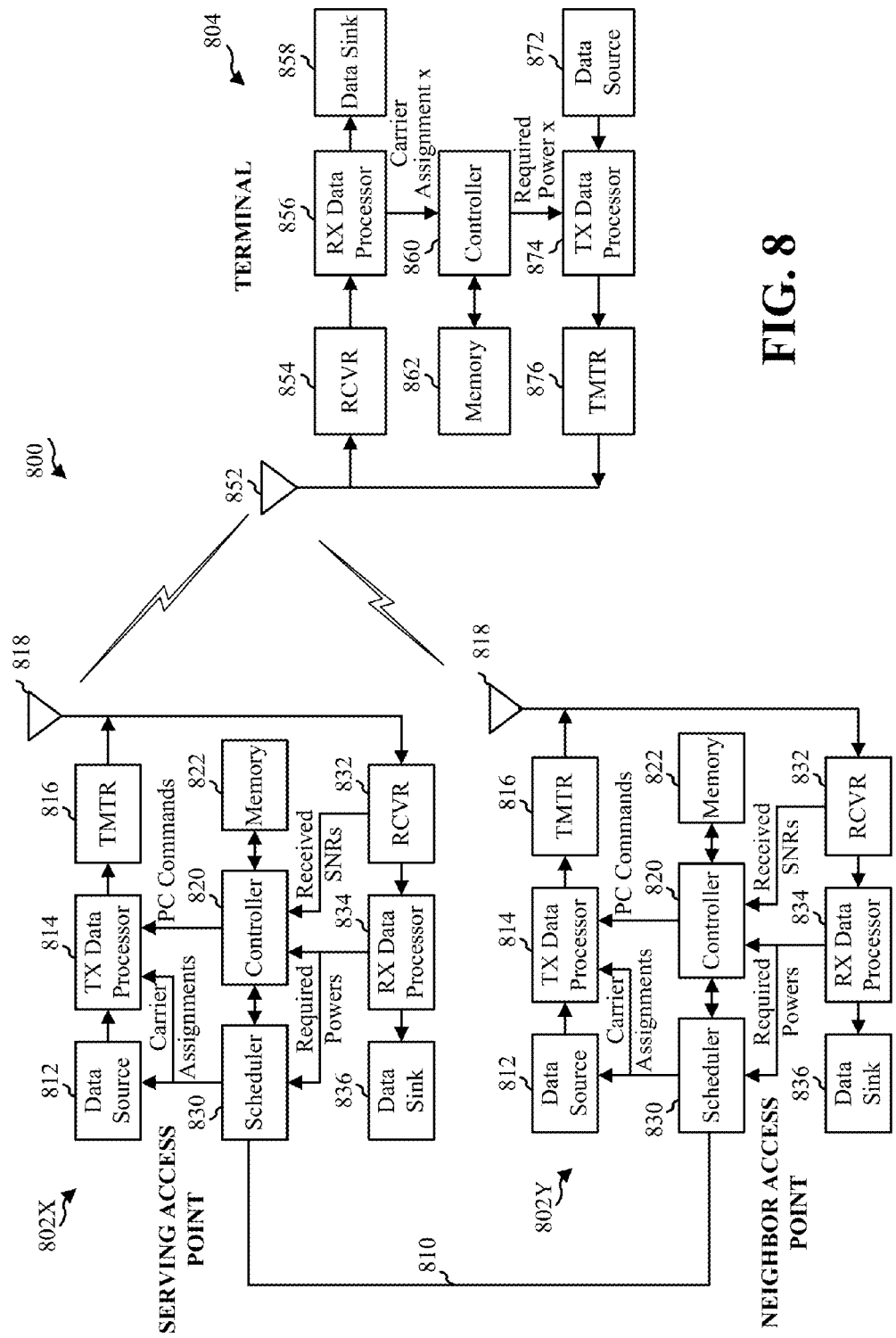
FIG. 8 is an illustration of a wireless communication environment that can be employed in conjunction with the various systems and methods described herein.

FIG. 8 shows an exemplary wireless communication system 800. The wireless communication system 800 depicts one terminal and two access points for sake of brevity. However, it is to be appreciated that the system can include one or more access points and/or more than one terminal, wherein additional access points and/or terminals can be substantially similar or different from the exemplary access points and terminal described below. In addition, it is to be appreciated that the access points and/or the terminal can employ the systems (FIGS. 1, 4-7) and/or methods (FIGS. 2-3) described herein.

FIG. 8 shows a block diagram of a terminal 804, a serving access point 802X point that supports terminal 804 and a neighbor access point 802Y in multiple-access multi-carrier communication system 800. At access point 802X, a transmit (TX) data processor 814 receives traffic data (i.e., information bits) from a data source 812 and signaling and other information from a controller 820 and a scheduler 830. For example, scheduler 830 may provide assignments of carriers for the terminals. Additionally, a memory 822 can maintain information regarding current or previous assignments. TX data processor 814 encodes and modulates the received data using multi-carrier modulation (e.g., OFDM) to provide modulated data (e.g., OFDM symbols). A transmitter unit (TMTR) 816 then processes the modulated data to generate a downlink modulated signal that is then transmitted from an antenna 818.

Prior to transmission of assignment information to terminal 804, scheduler can provide assignment information to access point 802Y. The assignment information can be provided via backhaul signaling (e.g., a Ti line) 810. Alternatively, assignment information can be provided to access point 802Y after transmission to terminal 804.

At terminal 804, the transmitted and modulated signal is received by an antenna 852 and provided to a receiver unit (RCVR) 854. Receiver unit 854 processes and digitizes the received signal to provide samples. A received (RX) data processor 856 then demodulates and decodes the samples to provide decoded data, which may include recovered traffic data, messages, signaling, and so on. The traffic data may be provided to a data sink 858, and the carrier assignment information for the terminal 804 is provided to a controller 860.

Controller 860 directs data transmission on the uplink using the specific carriers that have been assigned to terminal 804 and indicated in the received carrier assignment. A memory 862 can maintain information regarding assigned resources (e.g., frequency, time and/or code) and other related information.

For terminal 804, a TX data processor 874 receives traffic data from a data source 872 and signaling and other information from controller 860. The various types of data are coded and modulated by TX data processor 874 using the assigned carriers and further processed by a transmitter unit 876 to generate an uplink modulated signal that is then transmitted from antenna 852.

At access points 802X and 802Y, the transmitted and modulated signals from terminal 804 are received by antenna 818, processed by a receiver unit 832, and demodulated and decoded by an RX data processor 834. Transmitted signals can be decoded based upon assignment information generated by serving access point 802X and provided to neighbor access point 802Y. In addition, access points 802X and 802Y can generate an acknowledgement (ACK) that can be provided to the other access point (802X or 802Y) and/or to terminal 804. The decoded signals can be provided to a data sink 836. Receiver unit 832 may estimate the received signal quality (e.g., the received signal-to-noise ratio (SNR)) for each terminal and provide this information to controller 820. RX data processor 834 provides the recovered feedback information for each terminal to controller 820 and scheduler 830.

Scheduler 830 uses the feedback information to perform a number of functions such as (1) selecting a set of terminals for data transmission on the reverse link and (2) assigning carriers to the selected terminals. The carrier assignments for the scheduled terminals are then transmitted on the forward link to these terminals.

The techniques described herein may be implemented by various means. For example, these techniques may be implemented in hardware, software, or a combination thereof. For a hardware implementation, the processing units (e.g., controllers 820 and 860, TX and RX processors 814 and 834, and so on) for these techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of fast access in a wireless communication system, the method comprising:
   generating an access probe preamble which comprises an access signature that facilitates selection of bandwidth resources and modulation and coding for one or more messages, wherein the access probe preamble indicates downlink information that enables power control of an access grant message sent on the downlink in response to the access probe preamble;
   transmitting the access probe preamble on a random access channel; and
   retransmitting the access probe preamble at higher power if an access grant is not received within a predetermined time period.

2. The method of claim 1, wherein the access signature comprises downlink information.

3. The method of claim 1, wherein the access signature comprises a Cell ID.

4. The method of claim 1, further comprising receiving the access grant associated with the access probe preamble.

5. The method of claim 1, further comprising:
   deriving an access sequence based at least in part on a random number, to facilitate avoiding collisions, wherein the access probe further comprises the access sequence.

6. The method of claim 1, further comprising transmitting an open connection request message.

7. The method of claim 1, further comprising receiving an open connection response message.

8. The method of claim 1, wherein the access signature is a function of a terminal's ID.

9. A method of fast access in a wireless communication system, the method comprising:
   receiving an access probe preamble retransmitted on a random access channel at a higher power, if an access grant is not received at a terminal within a predetermined time period, wherein the access probe preamble indicates downlink information that enables power control of an access grant message sent on the downlink in response to the access probe preamble;
   selecting bandwidth resources and modulation and coding for one or more messages based, at least in part, on the received access probe preamble;
   generating the access grant, wherein the access grant indicates the selection;
   scrambling the access grant using information received from the access probe preamble; and
   transmitting the scrambled access grant.

10. The method of claim 9, wherein the access grant comprises a terminal MAC ID and an uplink resource assignment information for initial access.

11. An apparatus for fast access in a wireless communication system, the apparatus comprising:
   means for generating an access probe preamble which comprises an access signature that facilitates selection of bandwidth resources and modulation and coding for one or more messages, wherein the access probe preamble indicates downlink information that enables power control of an access grant message sent on the downlink in response to the access probe preamble;

means for transmitting the access probe preamble on a random access channel; and means for retransmitting the access probe preamble at higher power if an access grant is not received within a predetermined time period.

12. The apparatus of claim 11, wherein the access signature comprises downlink information.

13. The apparatus of claim 11, wherein the access signature comprises a Cell ID.

14. The apparatus of claim 11, further comprising means for receiving the access grant associated with the access probe preamble.

15. The apparatus of claim 14, further comprising means for decoding the access grant.

16. The apparatus of claim 11, further comprising means for transmitting an open connection request message.

17. The apparatus of claim 11, further comprising means for receiving an open connection response message.

18. The apparatus of claim 11, wherein the access signature is function of a terminal's ID.

19. An apparatus for fast access in a wireless communication system, the apparatus comprising:

means for receiving an access probe preamble retransmitted on a random access channel at a higher power when an access grant is not received, at a terminal, within a predetermined time period, wherein the access probe preamble indicates downlink information that enables power control of an access grant message sent on the downlink in response to the access probe preamble;

means for selecting bandwidth resources and modulation and coding for one or more messages based, at least in part, on the received access probe preamble;

means for generating the access grant, wherein the access grant indicates the selection;

means for scrambling the access grant using information received from the access probe preamble; and means for transmitting the scrambled access grant.

20. The method of claim 19, wherein the access grant comprises a terminal MAC ID and an uplink resource assignment information for initial access.

21. An apparatus for fast access in a wireless communication system, the apparatus comprising:

a processor for:

generating an access probe preamble which comprises an access signature that facilitates selection of bandwidth resources and modulation and coding for one or more messages, wherein the access probe preamble indicates downlink information that enables power control of an access grant message sent on the downlink in response to the access probe preamble, and a transmitter for transmitting the access probe preamble on a random access channel and retransmitting the access probe preamble at higher power if an access grant is not received within a predetermined time period.

22. An apparatus for fast access in a wireless communication system, the apparatus comprising:

a receiver for receiving an access probe preamble retransmitted on a random access channel at a higher power when an access grant is not received, at a terminal, within a predetermined time period, wherein the access probe preamble indicates downlink information that enables power control of an access grant message sent on the downlink in response to the access probe preamble;

a scheduler for selecting bandwidth resources and modulation and coding for one or more messages based, at least in part, on the received access probe preamble;

a processor for generating the access grant, wherein the access grant indicates the selection, the processor further for scrambling the access grant using information from the access probe preamble; and a transmitter for transmitting the scrambled access grant.

23. A non-transitory computer readable medium having stored thereon computer executable instructions for performing the following instructions:

generating an access probe preamble comprising an access signature that facilitates selection of bandwidth resources and modulation and coding for one or more messages, wherein the access probe preamble indicates downlink information that enables power control of an access grant message sent on the downlink in response to the access probe preamble;

transmitting the access probe preamble on a random access channel; and retransmitting the access probe preamble at higher power if an access grant is not received within a predetermined time period.

24. A non-transitory computer readable medium having stored thereon computer executable instructions for performing the following instructions:

receiving an access probe preamble retransmitted on a random access channel at a higher power, if an access grant is not received at a terminal within a predetermined time period, wherein the access probe preamble indicates downlink information that enables power control of an access grant message sent on the downlink in response to the access probe preamble;

selecting bandwidth resources and modulation and coding for one or more messages based, at least in part, on the received access probe preamble;

generating the access grant, wherein the access grant indicates the selection;

scrambling the access grant using information received from the access probe preamble; and transmitting the scrambled access grant.

* * * * *